United States Patent
Tsujino et al.

(10) Patent No.: US 12,392,630 B2
(45) Date of Patent: Aug. 19, 2025

(54) VEHICLE DISPLAY CONTROL DEVICE, VEHICLE DISPLAY CONTROL METHOD, AND STORAGE MEDIUM

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Ryota Hamabe, Nisshin (JP); Takashi Osawa, Toyota (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/494,363

(22) Filed: Oct. 25, 2023

(65) Prior Publication Data

US 2024/0210201 A1 Jun. 27, 2024

(30) Foreign Application Priority Data

Dec. 26, 2022 (JP) ................. 2022-209003

(51) Int. Cl.
| | |
|---|---|
| *G08G 1/123* | (2006.01) |
| *B60W 50/14* | (2020.01) |
| *G01C 21/36* | (2006.01) |
| *G08G 1/0967* | (2006.01) |

(52) U.S. Cl.
CPC .......... *G01C 21/367* (2013.01); *B60W 50/14* (2013.01); *G08G 1/0967* (2013.01)

(58) Field of Classification Search
CPC ... G01C 21/367; B60W 50/14; G08G 1/0967; G08G 1/096725; G08G 1/0969; B60K 35/00
USPC ....................................... 340/995.12
See application file for complete search history.

(56) References Cited

U.S. PATENT DOCUMENTS

| | | | | |
|---|---|---|---|---|
| 2005/0154505 A1* | 7/2005 | Nakamura | ............. | G02B 27/01 |
| | | | | 701/1 |
| 2015/0379776 A1* | 12/2015 | Ito | ............. | G02B 30/52 |
| | | | | 345/419 |
| 2018/0040302 A1 | 2/2018 | Kuzuoka | | |
| 2018/0178713 A1 | 6/2018 | Fujii | | |
| 2018/0178716 A1 | 6/2018 | Fujii | | |
| 2021/0162865 A1* | 6/2021 | Ogata | ............. | B60K 35/00 |
| 2023/0191911 A1* | 6/2023 | Izumi | ............. | B60K 35/10 |
| | | | | 701/36 |
| 2023/0228588 A1* | 7/2023 | Lee | ............. | B60K 35/10 |
| | | | | 701/455 |
| 2024/0187556 A1* | 6/2024 | Yamamoto | ............. | G06V 20/588 |

FOREIGN PATENT DOCUMENTS

| | | |
|---|---|---|
| JP | 2018-103766 A | 7/2018 |
| JP | 2018-103768 A | 7/2018 |
| WO | 2016/181595 A1 | 11/2016 |

\* cited by examiner

*Primary Examiner* — Tai T Nguyen
(74) *Attorney, Agent, or Firm* — Oliff PLC

(57) ABSTRACT

A vehicle display control device includes a processor. The processor acquires map information based on a current position of a vehicle. The processor acquires peripheral information of the vehicle. The processor sets, based on the map information and the peripheral information, a first display area that displays a map of an area around the vehicle and a second display area that displays a road condition around the vehicle on a display unit in a vehicle cabin.

18 Claims, 7 Drawing Sheets

VEHICLE DISPLAY CONTROL DEVICE, VEHICLE DISPLAY CONTROL METHOD, AND STORAGE MEDIUM

CROSS-REFERENCE TO RELATED APPLICATION

This application claims priority to Japanese Patent Application No. 2022-209003 filed on Dec. 26, 2022, incorporated herein by reference in its entirety.

BACKGROUND

1. Technical Field

The present disclosure relates to a vehicle display control device, a vehicle display control method, and a storage medium.

2. Description of Related Art

WO 2016/181595 discloses a vehicle display device that displays vehicle information such as vehicle speed against the background of map information included in navigation information. WO 2016/181595 proposes displaying an icon indicating a position during route guidance so as not to overlap vehicle information such as vehicle speed.

Recent years have seen vehicles that are generally equipped with various advanced driving assistant systems (ADAS). In operation of ADAS, various sensors mounted on a vehicle are used to acquire peripheral information of the vehicle, and a road condition around the vehicle is recognized based on the acquired peripheral information.

When a vehicle executes control to recognize the road condition, it is expected to present the road condition that the vehicle recognizes together with map information of a peripheral area to support a user's understanding of the control related to the vehicle. However, as the related art described above does not take this point into consideration, there is room for improvement.

SUMMARY

The present disclosure provides a vehicle display control device, a vehicle display control method, and a storage medium capable of assisting a user's understanding of control related to a vehicle.

A first aspect of the present disclosure relates to a vehicle display control device including a processor. The processor is configured to acquire map information based on a current position of a vehicle. The processor is configured to acquire peripheral information of the vehicle. The processor is configured to set, based on the map information and the peripheral information, a first display area that displays a map of an area around the vehicle and a second display area that displays a road condition around the vehicle on a display unit in a vehicle cabin.

In the above-described configuration, the first display area for displaying the map of the area around the vehicle and the second display area for displaying the road condition around the vehicle can be set on the display unit provided in the vehicle cabin. As a result, a user looking at the display unit can grasp the road condition that the vehicle recognizes together with the peripheral map information. Therefore, the vehicle display control device can support the user's understanding of the control related to the vehicle.

The processor may be configured to display the map in plan view and to display a position of the vehicle and positions of other vehicles on the map.

In the above-described configuration, by displaying the map of the area around the vehicle in plan view, it is possible to reduce the load of display control processing for the two display areas. Also, by displaying the positions of the vehicle and other vehicles on the map, correspondence between the map information and the road condition that the vehicle recognizes can be easily understood depending on the display aspect. As a result, the vehicle display control device can enhance the user's comprehension of control related to the vehicle while minimizing the load of the display control processing.

The processor may be configured to acquire vehicle information on a driving assist system mounted on the vehicle. The processor may be configured to set the second display area to be smaller than the first display area when operation of a predetermined driving assist system is detected based on the vehicle information.

In this configuration, when the operation of the predetermined driving assist system is detected based on the vehicle information, the second display area is set to be smaller than the first display area and the road condition begins being displayed. As a result, in the vehicle display control device, it is possible for the display unit to provide guidance on the road condition that the vehicle recognizes along with the operation of the predetermined driving assist system while maintaining the consistency of the display that mainly displays the map of the area around the vehicle. As a result, the vehicle display control device is designed to afford the user a better understanding of the control related to the vehicle without impairing the user's comprehension of the map information.

The processor may be configured to acquire driving information on a driving state of a driver of the vehicle. The processor may be configured to set the second display area to be larger than the first display area when operation of the predetermined driving assist system is detected based on the vehicle information and a hands-off state in which the driver has released a steering wheel is detected based on the driving information.

In this configuration, the operation of the predetermined driving assist system is detected based on the vehicle information, and the second display area is set to be larger than that of the first display area when the hands-off state in which the driver has released the steering wheel is detected based on the driving information. As a result, when the driver has released the steering wheel, the display unit can switch the display aspect that primarily displays the road condition around the vehicle, thereby minimizing any decrease in the driver's attention to the driving operation. As a result, during critical timing when a heightened understanding of the controls executed by the vehicle is required, it becomes possible to effectively support the user's comprehension and enhance safety during travel.

A second aspect of the present present disclosure relates to a vehicle display control method including acquiring map information based on a current position of a vehicle, acquiring peripheral information of the vehicle, and setting, based on the information and the peripheral information, a first display area that displays a map of an area around the vehicle and a second display area that displays a road condition around the vehicle on a display unit in a vehicle cabin.

A third aspect of the present disclosure relates to a non-transitory storage medium storing instructions that are executable by one or more processors and that cause the one or more processors to perform functions which include acquiring map information based on a current position of a vehicle, acquiring peripheral information of the vehicle, and setting, based on the map information and the peripheral information, a first display area that displays a map of an area around the vehicle and a second display area that displays a road condition around the vehicle on a display unit in a vehicle cabin.

As described above, the vehicle display control device, the vehicle display control method, and the storage medium according to the present disclosure can assist a user's understanding of control related to the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle display control device 10 according to a present embodiment will be described below with reference to FIGS. 1 to 8.

Figure 1:
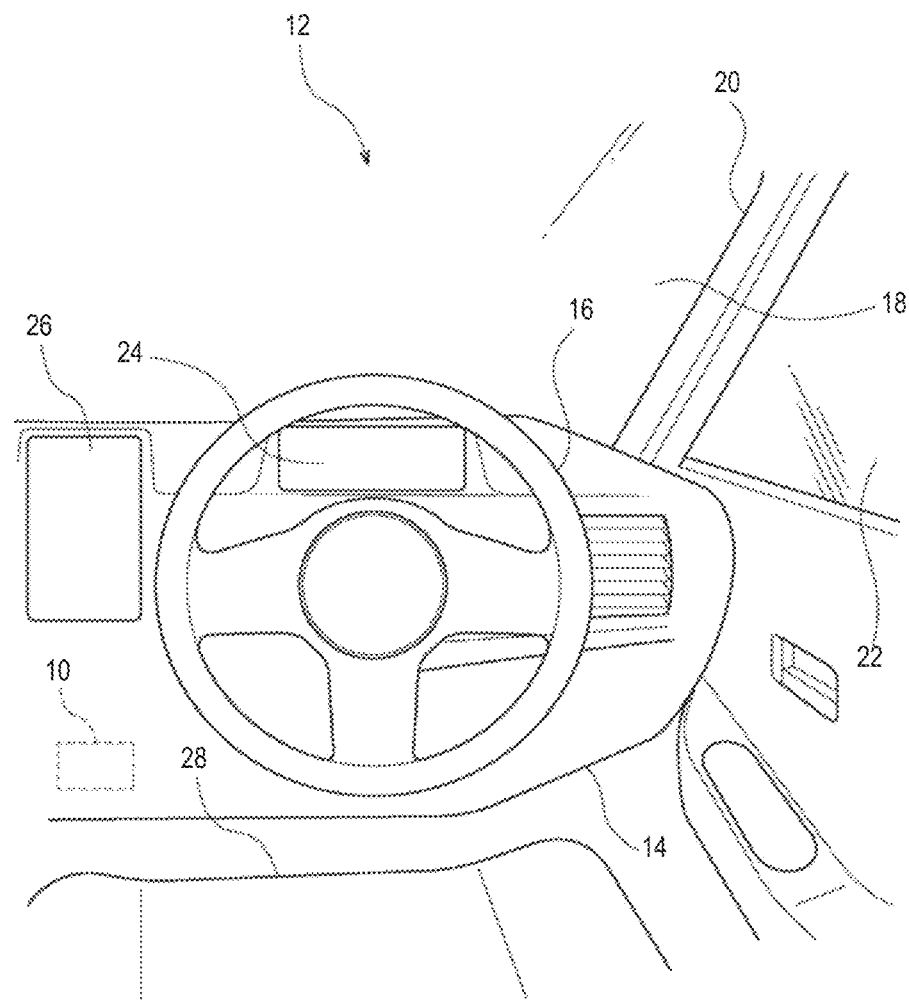
FIG. 1 is a schematic view of a front portion in a vehicle cabin of a vehicle to which a vehicle display control device according to a present embodiment is applied, viewed from a vehicle rear side.

As illustrated in FIG. 1, in a vehicle 12, an instrument panel 14 is provided in the front portion in a vehicle cabin. The instrument panel 14 extends horizontally within a vehicle, and a steering wheel 16 is provided on a vehicle right side of the instrument panel 14. That is, in the present embodiment, as an example, the vehicle is a right-hand drive vehicle in which the steering wheel 16 is provided on the right side, and a driver's seat 28 is situated on the vehicle right side.

A windshield glass 18 is provided at a front end portion of the instrument panel 14. The windshield glass 18 extends vertically and horizontally within a vehicle and in a vehicle width direction to separate the inside of the vehicle cabin from the outside of the vehicle cabin.

A vehicle right end portion of the windshield glass 18 is fixed to a front pillar 20 on a vehicle right side. Specifically, the front pillar 20 extends substantially vertically within the vehicle, and a windshield glass 18 is fixed to an inner end portion of the front pillar 20 aligned with the width of the vehicle. A front end portion of a front side glass 22 is fixed to an outer end portion of the front pillar 20 aligned with the width of the vehicle. A vehicle left end portion of the windshield glass 18 is fixed to a front pillar (not illustrated) on a vehicle left side.

Here, the instrument panel 14 is provided with a first display unit 24 as a display unit. The first display unit 24 is a display provided on a vehicle front side of a driver's seat 28 on the vehicle right side of the instrument panel 14. A predetermined image is displayed on the first display unit 24 by a meter display device 44 (see FIG. 2) as a vehicle display device. Further, the first display unit 24 is connected to various meter devices mounted on the vehicle 12, and is provided at a position within a field of vision of a driver with his/her eyes directed forward the front of the vehicle.

A second display unit 26 is horizontally provided in a central portion of the instrument panel 14 within the vehicle. The second display unit 26 of the present embodiment is a display formed in a substantially rectangular shape, and a predetermined image is displayed by a center display device 46 (see FIG. 2) as a vehicle display device.

Here, the vehicle 12 is provided with the vehicle display control device 10. The vehicle display control device 10 of the present embodiment is composed of, for example, one or a plurality of electronic control units (ECUs). A vehicle display control device 10 of the present embodiment displays various images on the first display unit 24 forming the display of the meter display device 44. By displaying a map of an area around the vehicle and a road condition around the vehicle on the first display unit 24, the vehicle display control device 10 can present to the driver the peripheral road condition recognized on a vehicle side together with map information around the vehicle.

Hardware Configuration of Vehicle Display Control Device 10

Figure 2:
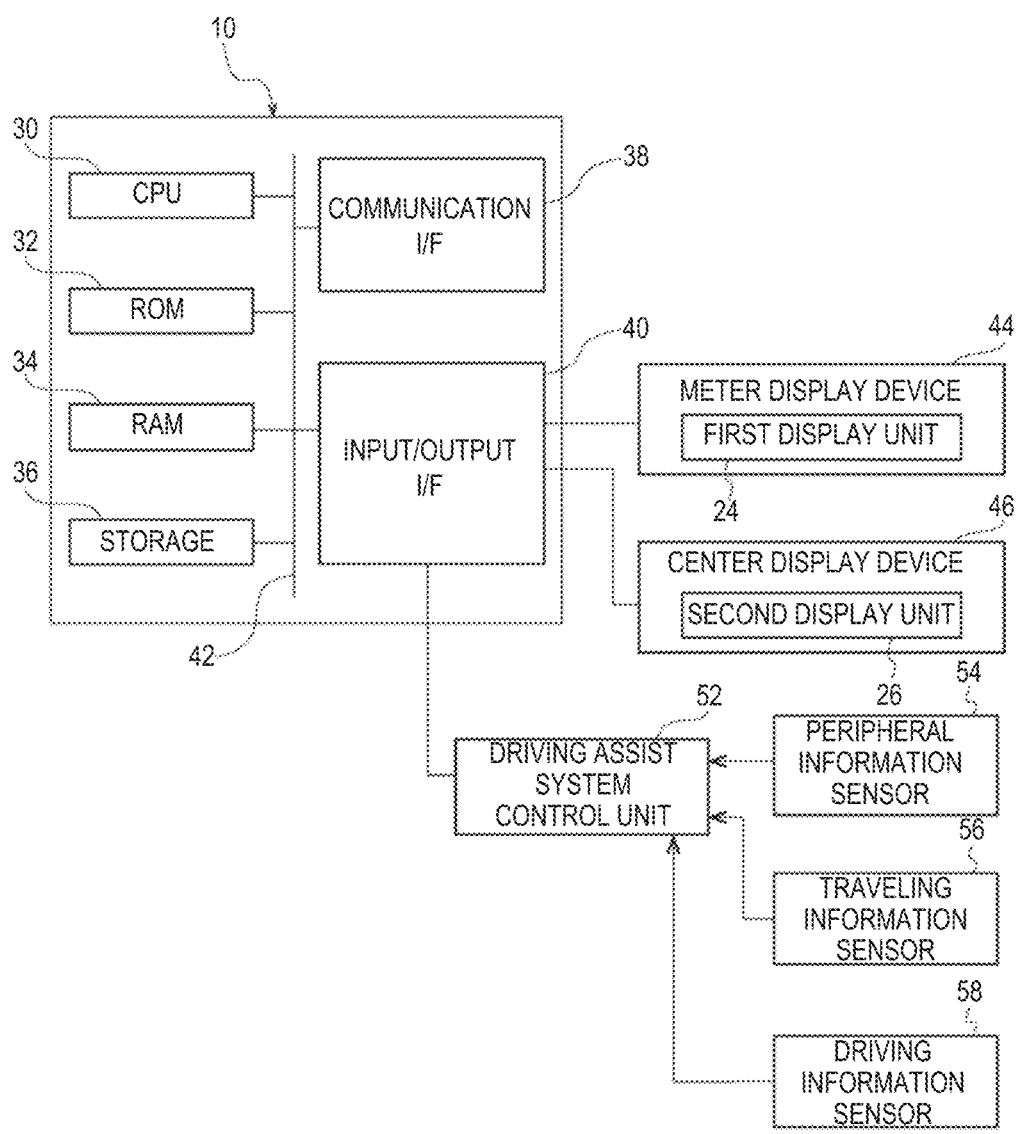
FIG. 2 is a block diagram illustrating a hardware configuration of the vehicle display control device according to the present embodiment.

FIG. 2 is a block diagram illustrating a hardware configuration of the vehicle display control device 10. As illustrated in FIG. 2, the vehicle display control device 10 includes a central processing unit (CPU: processor) 30, a read only memory (ROM) 32, a random access memory (RAM) 34, a storage 36, a communication interface (communication I/F) 38, and an input/output interface (input/output I/F) 40. Components are communicatively connected to each other via a bus 42.

The CPU 30 is a central processing unit that executes various programs and controls each unit. That is, the CPU 30 reads a program from the ROM 32 or the storage 36 and executes the program using the RAM 34 as a work area. The CPU 30 performs control of the above-described components and various arithmetic processing according to the programs recorded in the ROM 32 or the storage 36.

The ROM 32 stores various programs and various data. The RAM 34 temporarily stores programs or data as a work area. The storage 36 is configured by a hard disk drive (HDD) or a solid state drive (SSD) and stores various programs including an operating system and various data. In the present embodiment, the ROM 32 or the storage 36 stores a program for which performs display processing, which will be described below, various data, and the like.

The communication I/F 38 is an interface for the vehicle display control device 10 to communicate with an external server and other devices. The communication I/F 38 uses standards such as controller area network (CAN), Ethernet (registered trademark), long term evolution (LTE), fiber distributed data interface (FDDI), and Wi-Fi (registered trademark).

The input/output I/F 40 is electrically connected to the meter display device 44, the center display device 46, and a driving assist system control unit 52. The meter display device 44 causes the first display unit 24 to display predetermined information. The center display device 46 causes the second display unit 26 to display predetermined information.

The driving assist system control unit 52 is composed of, for example, one or more electronic control units (ECUs). This driving assist system control unit 52 can control various driving assist systems mounted on the vehicle 12. The driving assist system control unit 52 acquires peripheral information of the vehicle 12 from a peripheral information sensor 54. Also, the driving assist system control unit 52 acquires traveling information of the vehicle 12 from a traveling information sensor 56. Further, the driving assist system control unit 52 acquires driving information of the vehicle 12 from a driving information sensor 58.

Peripheral information of the vehicle 12 includes information on the traveling lane of the vehicle 12 and detection information of objects (vehicles, people, obstacles, or the like) existing nearby. The traveling information of the vehicle 12 includes information indicating a vehicle state regarding traveling, such as the traveling speed, acceleration, steering angle, and the like of the vehicle 12. The driving information of the vehicle 12 includes information on the driving operation performed by the driver on an operation unit in the vehicle cabin.

The peripheral information sensor 54 is configured by combining sensors represented by, for example, a camera, an ultrasonic sensor, a millimeter wave radar, a Lidar, a GPS receiving sensor, and the like. The traveling information sensor 56 includes, for example, a wheel speed sensor, an acceleration sensor, a yaw rate sensor, a steering angle sensor, and the like. The driving information sensor 58 is electrically connected to various operation units in the vehicle cabin and detects input operations to the various operation units.

The driving assist system control unit 52 can control various driving assist systems based on the peripheral information, vehicle information, and driving information.

Various driving assist systems mounted on the vehicle 12 include an automatic driving assist system and various advanced driving assistant systems (ADAS). The driving assist system control unit 52 controls various actuators mounted on the vehicle 12 to automatically perform some or all of the operation of the accelerator, brake, direction indicator, steering wheel, and the like of the vehicle 12, thereby operating various driving assist systems.

The driving assist system mounted on the vehicle 12 includes, as ADAS, a stop system to avoid contact between a detected object and the vehicle 12, an adaptive cruise control (ACC) system, a lane tracing assist (LTA) system, a lane change assist (LCA) system, and the like. The stop system, ACC system, LTA system, and LCA system are known (see, for example, Japanese Unexamined Patent Application Publication No. 2018-103766, Japanese Unexamined Patent Application Publication No. 2018-103768, and the like). Accordingly, a detailed description of each driving assist system will be omitted, and only the ACC system, which will be described below, will be briefly described below as an example of the driving assist system.

ACC System

The ACC system is a system that acquires vehicle peripheral information from the peripheral information sensor 54 (see FIG. 2) mounted on the vehicle, and controls accelerator and brake operations based on the acquired peripheral information to assist driving.

More specifically, based on peripheral information, when there is a preceding vehicle traveling in front of the subject vehicle on the traveling lane, the ACC system maintains an inter-vehicle distance between the preceding vehicle and the subject vehicle at a predetermined distance and causes the subject vehicle to follow the preceding vehicle. Also, when there is no preceding vehicle on the driving lane, this system causes the subject vehicle to travel at a constant set vehicle speed.

The ACC system operates when the driving assist system control unit 52 receives a follow-up inter-vehicle distance assistance request based on the driver's operation on an operation unit (not illustrated). The driving assist system control unit 52 determines whether a predetermined ACC system execution condition is satisfied, and operates the ACC system when the ACC system execution condition is satisfied.

When the ACC system is operated, the driving assist system control unit 52 recognizes the traveling lane in which the subject vehicle is traveling and the position of the traveling vehicle which the subject vehicle is following as a road condition around the vehicle. The driving assist system control unit 52 also recognizes peripheral information related to other driving assist systems (for example, the LTA system, the LCA system, and the like) that are conditional on an operating state of the ACC system as the road condition around the vehicle.

Functional Configuration of Vehicle Display Control Device 10

The vehicle display control device 10 realizes various functions using the above-described hardware resources. Functional configurations realized by the vehicle display control device 10 will be described with reference to FIG. 3.

Figure 3:
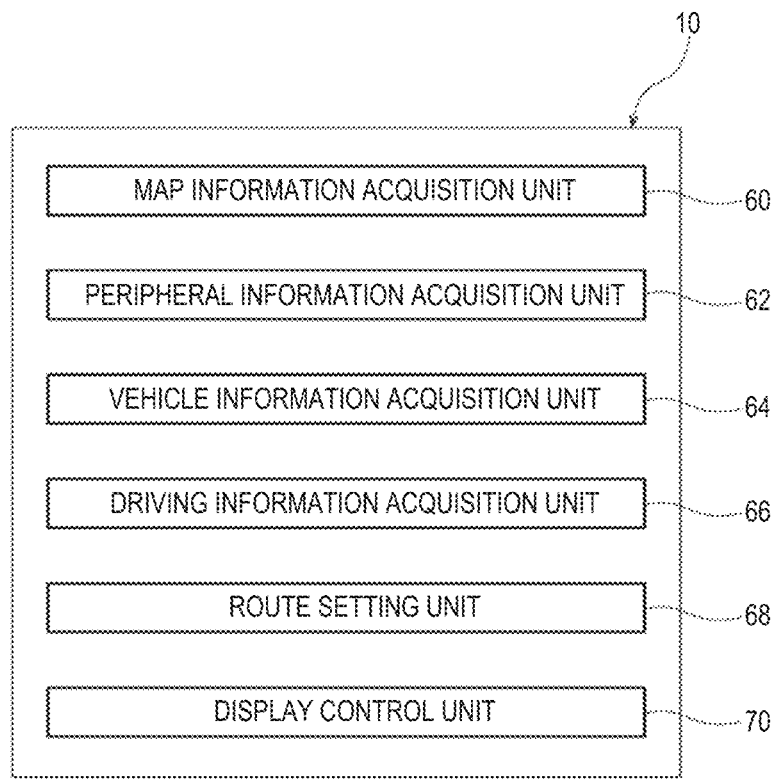
FIG. 3 is a block diagram illustrating a functional configuration of the vehicle display control device according to the present embodiment.

As illustrated in FIG. 3, the vehicle display control device 10 includes, as functional configurations, a map information acquisition unit 60, a peripheral information acquisition unit 62, a vehicle information acquisition unit 64, a driving information acquisition unit 66, a route setting unit 68, and a display control unit 70. Each functional configuration is realized by the CPU 30 reading and executing a program stored in the ROM 32 or the storage 36.

The map information acquisition unit 60 acquires map information based on a current position of the vehicle. For example, the map information acquisition unit 60 acquires map information around the vehicle from an external server (not illustrated) based on the current position of the vehicle 12 acquired from a GPS receiving sensor (not illustrated). In addition, when the map information is stored in the storage 36 of the vehicle 12, the map information around the vehicle may be acquired from the storage 36.

The peripheral information acquisition unit 62 acquires peripheral information of the vehicle 12. Specifically, the peripheral information acquisition unit 62 acquires peripheral information detected by the peripheral information sensor 54 mounted on the vehicle 12. The peripheral information includes detection information of lane marking on the road ahead of the vehicle, detection information of other vehicles traveling in the traveling lane of the vehicle 12, and detection information of other vehicles traveling in adjacent lanes.

The vehicle information acquisition unit 64 acquires vehicle information on the driving assist system mounted on the vehicle. Specifically, the vehicle information acquisition unit 64 acquires information on an operating status of various driving assist systems from the driving assist system control unit 52.

The driving information acquisition unit 66 acquires driving information on the driving state of the vehicle by the driver. Specifically, the driving information acquisition unit 66 acquires from the driving information sensor 58 the information on the driving state of the operation unit of the vehicle by the driver. Particularly in the present embodiment, the driving information acquisition unit 66 acquires information on whether the driver's driving state is a hands-off state or a hands-on state. The hands-off state is a state in which the driver has released the steering wheel. Also, the hands-on state is a state in which the driver is holding the steering wheel.

The route setting unit 68 sets a travel route from the current position to a destination based on the current position of the vehicle 12, position information of the destination set by a user, and map information acquired from an external server.

The display control unit 70 controls images displayed on the first display unit 24 provided in the vehicle cabin, based on map information, peripheral information, vehicle information, and driving information.

As an example, the image displayed on the first display unit 24 is selected according to a predetermined display mode set by the user from a plurality of preset display modes. In the present embodiment, in particular, a display mode in which a first display area displaying a map of an area around the vehicle and a second display area displaying a road condition around the vehicle can be set on the first display unit 24 will be described.

Figure 4:
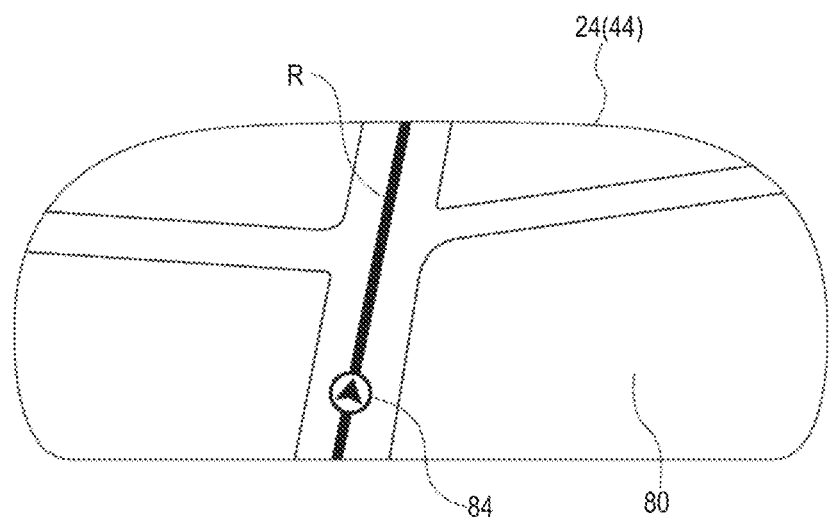
FIG. 4 is a view illustrating an example of display in a state before a predetermined driving assist system is operated.

As illustrated in FIG. 4, the display control unit 70 starts displaying the first display unit 24 when, for example, an ignition switch of the vehicle is turned on. As illustrated in FIG. 4, the display control unit 70 sets the entire display area of the first display unit 24 as a first display area 80 showing the map of the area around the vehicle. In the first display area 80, for example, the map of the area around the vehicle is displayed in plan view. Also, on the map, a first icon 84 indicating the position of the subject vehicle and a travel route R to the destination set by the route setting unit 68 are displayed as a predetermined image. When the user does not set the destination, the travel route R is not displayed.

When the vehicle information acquisition unit 64 detects the operation of a predetermined driving assist system, the display control unit 70 sets a part of the display area of the first display unit 24 as a second display area 82 for displaying the road condition around the vehicle. That is, the first display area 80 and the second display area 82 are set in the first display unit 24. The road condition around the vehicle is the road condition around the vehicle recognized based on the peripheral information of the vehicle 12 acquired by the peripheral information acquisition unit 62.

Also, the display control unit 70 changes the size relationship between the first display area 80 and the second display area 82 according to the driving state of the driver acquired by the driving information acquisition unit 66.

The predetermined driving assist system is, for example, a driving assist system that is at or above a predetermined level in the automatic driving level standardized by the Society of Automotive Engineers (SAE) and Society of Automotive Engineers of Japan (JSAE). In the present embodiment, a case where the ACC system of the vehicle 12 is operated will be described as an example.

Figure 5:
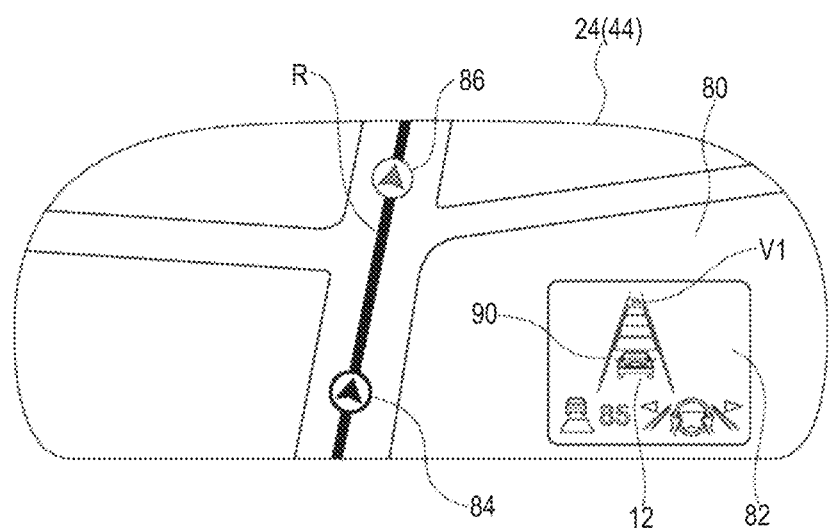
FIG. 5 is a view illustrating an example of display after the predetermined driving assist system is operated.

FIG. 5 illustrates a display example when the driver's driving state is in the hands-on state while the ACC system of the vehicle 12 is operating. In this state, the display control unit 70 sets the second display area 82 to be smaller than the first display area 80.

The second display area 82 displays a road condition that a vehicle recognizes as the ACC system operates. For example, in the second display area 82, a lane 90 in which the subject vehicle is traveling, i.e. a subject vehicle 12, and a preceding vehicle V1 that is followed by the subject vehicle are displayed as predetermined images. In this state, the first display area 80 displays on the map the first icon 84 indicating the position of the subject vehicle and a second icon 86 indicating the position of the preceding vehicle V1 that is followed by the subject vehicle.

In addition, the second display area 82 displays a road condition related to other driving assist systems that are conditioned on the operating state of the ACC system. For example, the position of a peripheral vehicle V2 traveling in a lane adjacent to the traveling lane is displayed as the road condition related to the LCA system.

The image showing the road condition displayed in the second display area 82 is, for example, an image showing the front side of the vehicle from the point of view (for example, the driver's eye point) in the vehicle cabin.

In addition, the second display area 82 also displays a preset constant traveling speed and an icon image (reference numerals omitted) indicating that the traveling lane is recognized.

Figure 6:
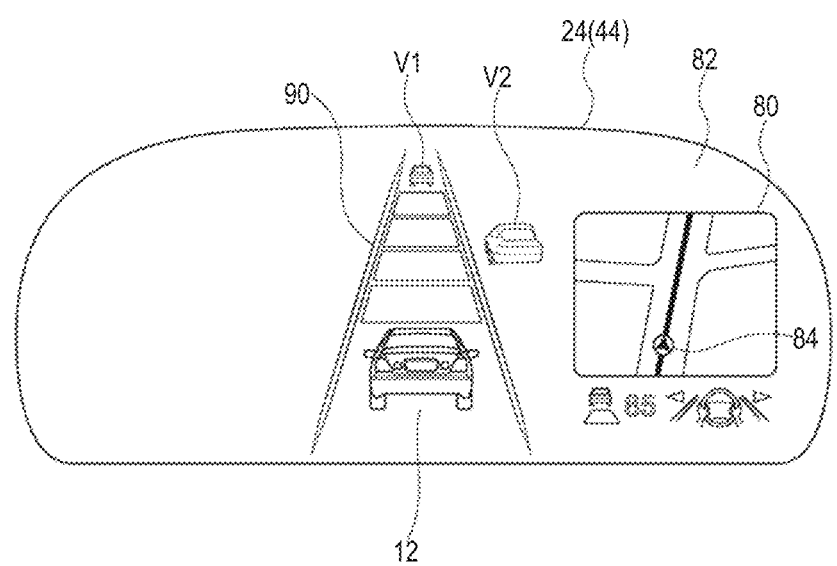
FIG. 6 is a view illustrating an example of display when it is detected that a driver is in a hands-off state after the predetermined driving assist system is operated.

FIG. 6 illustrates a display example when the driver's driving state is in the hands-off state while the ACC system of the vehicle 12 is operating. In this state, the display control unit 70 sets the second display area 82 to be larger than the first display area 80. As a result, in the hands-off state, the driver's attention to the road condition around the vehicle is suppressed from being lowered.

Operation

Next, an operation of the present embodiment will be described.

Output Processing

Figure 7:
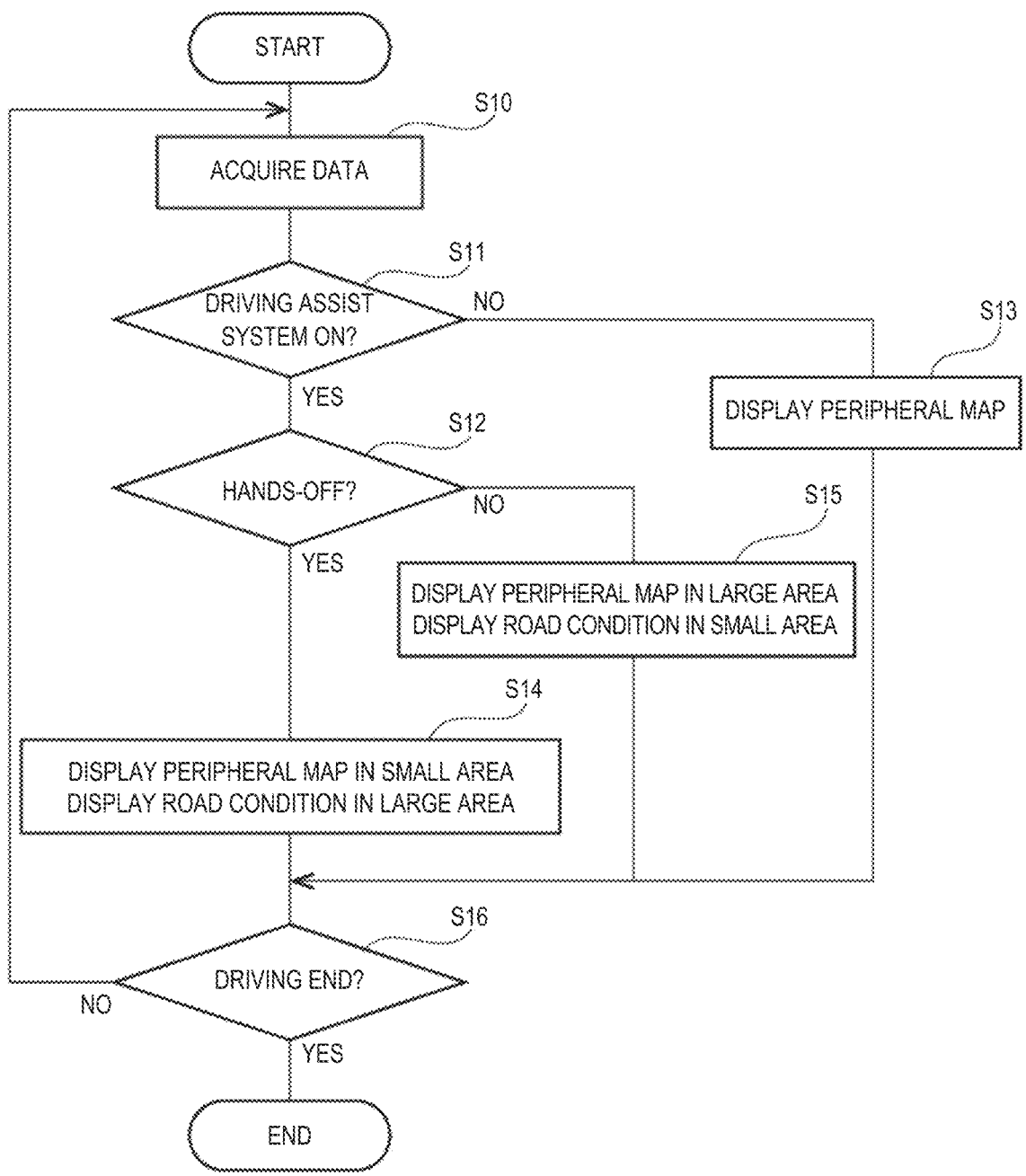
FIG. 7 is a flowchart illustrating an example of flow of display processing according to the present embodiment.
Figure 8:
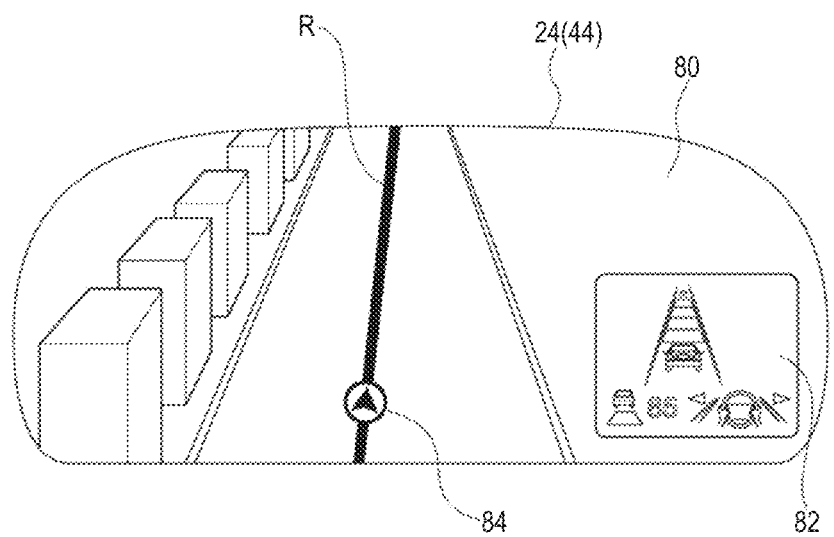
FIG. 8 is a view illustrating a modification example of display after the predetermined driving assist system is operated.

An example of display processing in the vehicle display control device 10 according to the present embodiment will be described with reference to a flowchart illustrated in FIG. 7. The display processing is executed by the CPU 30 reading a program from the ROM 32 or the storage 36 and developing it in the RAM 34. This display processing is executed, for example, when the ignition switch of the vehicle 12 is turned on.

The CPU 30 acquires various data in step S10. Specifically, the CPU 30 acquires peripheral information, vehicle information, driving information, and route information to the destination of the vehicle 12 using the functions of the map information acquisition unit 60, the peripheral information acquisition unit 62, the vehicle information acquisition unit 64, the driving information acquisition unit 66, and the route setting unit 68.

In step S11, the CPU 30 determines whether a predetermined driving assist system has been operated. The predetermined driving assist system is, for example, an ACC system. Based on the vehicle information acquired by the vehicle information acquisition unit 64, the CPU 30 determines whether the predetermined driving assist system has been operated. When the predetermined driving assist system is operating, the determination in step S11 is affirmative, and the CPU 30 proceeds to processing in step S12. On the other hand, when the determination in step S11 is negative, the CPU 30 proceeds to processing in step S13. In the processing of step S13, as illustrated in FIG. 4, the CPU 30 sets the first display area 80 on the first display unit 24 and starts displaying the map of the area around the vehicle. Also, on the map, the first icon 84 indicating the current position of the vehicle 12 and the travel route R to the destination are displayed.

In step S12, the CPU 30 determines whether the driver is in the hands-off state based on the driving information acquired by the driving information acquisition unit 66. When the driver is in the hands-off state, the determination in step S12 is affirmative, and the CPU 30 proceeds to processing in step S14. On the other hand, when the driver is not in the hands-off state, that is, in the hands-on state, the determination in step S12 is negative, and the CPU 30 proceeds to processing in step S15. In the processing of step S15, as illustrated in FIG. 5, the setting of the second display area is set in the first display unit 24, and the road condition around the vehicle is displayed in the second display area 82. Also, the second display area is set to be smaller than the first display area 80.

In step S14, the CPU 30 sets the second display area in the first display unit 24 and causes the second display area 82 to display the road condition around the vehicle. Also, as illustrated in FIG. 6, the setting of the second display area is set in the first display unit 24, and the second display area 82 is caused to display the road condition around the vehicle. Further, the second display area 82 is set to be larger than the first display area 80.

In step S16, the CPU 30 determines whether the driving of the vehicle 12 has ended based on the vehicle information acquired by the vehicle information acquisition unit 64. For example, when the ignition switch is turned off, it is determined that the driving has ended. When the ignition switch is turned off, the determination in step S16 is affirmative, and the CPU 30 terminates the display processing. On the other hand, when the ignition switch is turned on, the determination in step S16 is negative, and the CPU 30 returns to the processing of step S10.

As described above, in the vehicle display control device 10 according to the present embodiment, the first display area 80 for displaying a map of the area around the vehicle and the second display area 82 for displaying a road condition around the vehicle can be set in the first display unit 24 provided in the vehicle cabin. As a result, the user looking at the first display unit 24 can grasp the road condition that the vehicle recognizes together with the peripheral map information. Therefore, the vehicle display control device 10 can support the user's understanding of the control related to the vehicle.

Further, in the present embodiment, by displaying the map of the area around the vehicle in plan view, it is possible to reduce the load of the display control processing for the two display areas. Also, as illustrated in FIG. 5, by displaying the first icon 84 and the second icon 86 indicating the positions of subject vehicle and other vehicles on the map, the correspondence between the map information and the road condition that the vehicle recognizes becomes easy to understand depending on a display aspect. As a result, the vehicle display control device 10 can enhance the user's comprehension of the control related to the vehicle while minimizing the load of the display control processing.

Further, in the present embodiment, as illustrated in FIG. 5, when operation of the predetermined driving assist system is detected based on the vehicle information, the second display area 82 is set to be smaller than the first display area 80 to start displaying the road condition. As a result, in the vehicle display control device 10, in the first display unit 24, it is possible to provide guidance on the road condition that the vehicle recognizes along with the operation of the predetermined driving assist system while maintaining the consistency of the display that mainly displays the map of the area around the vehicle. As a result, the vehicle display control device 10 is designed to afford the user's better understanding of the control related to the vehicle without impairing the user's comprehension of the map information.

Further, as illustrated in FIG. 6, in the present embodiment, the operation of the predetermined driving assist system is detected based on the vehicle information, and the second display area 82 is set to be larger than the first display area 80 when the hands-off state in which the driver has released the steering wheel is detected based on the driving information. As a result, when the driver has released the steering wheel, the first display unit 24 can switch the display aspect that primarily displays the road condition around the vehicle, thereby minimizing a decrease in the driver's attention to the driving operation. As a result, during critical timing when a heightened understanding of the control related to the vehicle is required, it becomes possible to effectively support the user's comprehension and enhance safety during travel.

Although the vehicle display control device according to the embodiment is described above, it is needless to say that the vehicle display control device can be embodied in various forms without departing from the gist of the present disclosure. For example, in the above-described embodiment, the configuration in which the first display area and the second display area are set in the first display unit 24 of the meter display device 44 is described, but the present disclosure is not limited to this. For example, the second display unit 26 of the center display device 46 may be configured to have the first display area and the second display area.

Further, in the above-described embodiment, the map of the area around the vehicle is displayed in the first display area 80 as a two-dimensional map in plan view, but the present disclosure is not limited to this. As in a modification example illustrated in FIG. 8, the map of the area around the vehicle may be displayed as a three-dimensional stereoscopic map. In the illustrated example, the map of the area around the vehicle is a stereoscopic map image showing the front side of the vehicle from the point of view (for example, the driver's eye point) in the vehicle cabin. Also, the image of the road condition around the vehicle shown in the second display area 82 is the same. In this way, by making the images displayed on the first display area 80 and the second display area 82 simulate the field of view seen from substantially the same direction, correlation between the map information and the road condition can be made even easier.

Further, various processors other than the CPU 30 may execute the processing which is executed by the CPU 30 reading and executing the program in the above-described embodiment. Examples of the processor in this case include a programmable logic device (PLD) that can change the circuit configuration after manufacturing such as a field-programmable gate array (FPGA), and a dedicated electric circuit that is a processor with a circuit configuration specially designed to execute specific processing such as an application specific integrated circuit (ASIC). Also, virtual item display processing may be executed by one of these various processors, may be executed by a combination of two or more processors of the same type or different type, or may be executed by, for example, a plurality of FPGAs, a combination of a CPU and an FPGA, or the like. More specifically, the hardware structure of these various processors is an electric circuit in which circuit elements such as semiconductor elements are combined.

Further, in the above-described embodiment, various data are stored in the storage 36, but the present disclosure is not limited to this. For example, non-transitory recording media such as compact disk (CD), digital versatile disk (DVD), and universal serial bus (USB) memory may be used as storage units. In this case, various programs and data are stored in these recording media.

What is claimed is:

1. A vehicle display control device comprising a processor configured to:
    acquire map information based on a current position of a vehicle,
    acquire peripheral information of the vehicle, and
    set, on a display unit in a vehicle cabin of the vehicle and based on the map information and the peripheral information, (i) a first display area that displays a map of an area around the vehicle and (ii) a second display area that displays a road condition around the vehicle, wherein
    the processor is configured to switch between (a) a first display mode in which the first display area that displays the map is larger than the second display area that displays the road condition, and (b) a second display mode in which the second display area that displays the road condition is larger than the first display area that displays the map, and
    the processor switches between the first display mode and the second display mode based on a driving state of a driver of the vehicle.

2. The vehicle display control device according to claim 1 wherein the processor is configured to
    display the map in plan view, and
    display a position of the vehicle and positions of other vehicles on the map.

3. The vehicle display control device according to claim 1 wherein the processor is configured to
    acquire vehicle information on a driving assist system mounted on the vehicle, and
    set the second display area to be smaller than the first display area when operation of a predetermined driving assist system is detected based on the vehicle information.

4. The vehicle display control device according to claim 3 wherein the processor is configured to
    acquire driving information on the driving state of the driver of the vehicle, and
    set the second display area to be larger than the first display area when operation of the predetermined driving assist system is detected based on the vehicle information and a hands-off state in which the driver has released a steering wheel of the vehicle is detected based on the driving information.

5. The vehicle display control device according to claim 1, wherein
    the driving state of the driver of the vehicle is whether or not the driver of the vehicle has their hands on a steering wheel of the vehicle, so that the processor switches between the first display mode and the second display mode based on whether or not the driver of the vehicle has their hands on the steering wheel of the vehicle or does not have their hands on the steering wheel of the vehicle.

6. The vehicle display control device according to claim 5, wherein
    the processor switches to the first display mode when the driver of the vehicle has their hands on the steering wheel of the vehicle, and switches to the second display mode when the driver of the vehicle does not have their hands on the steering wheel of the vehicle.

7. The vehicle display control device according to claim 1, wherein
    in the first display mode, the second display area that displays the road condition is located within the first display area that displays the map, and
    in the second display mode, the first display area that displays the map is located within the second display area that displays the road condition.

8. The vehicle display control device according to claim 1, wherein
    the road condition that is displayed in the second display area includes a lane image, an image portraying the vehicle and an image of a preceding vehicle that is located ahead of the vehicle in a travelling direction of the vehicle and in a same lane as the vehicle.

9. A vehicle display control method executed by a processor and comprising:
    acquiring map information based on a current position of a vehicle;
    acquiring peripheral information of the vehicle;
    setting, on a display unit in a vehicle cabin of the vehicle and based on the map information and the peripheral information, (i) a first display area that displays a map of an area around the vehicle and (ii) a second display area that displays a road condition around the vehicle; and
    switching between (a) a first display mode in which the first display area that displays the map is larger than the second display area that displays the road condition, and (b) a second display mode in which the second display area that displays the road condition is larger than the first display area that displays the map, wherein
    the switching between the first display mode and the second display mode is based on a driving state of a driver of the vehicle.

10. The vehicle display control method according to claim 9, wherein
    the driving state of the driver of the vehicle is whether or not the driver of the vehicle has their hands on a steering wheel of the vehicle, so that the switching between the first display mode and the second display mode is based on whether or not the driver of the vehicle has their hands on the steering wheel of the vehicle or does not have their hands on the steering wheel of the vehicle.

11. The vehicle display control method according to claim 10, wherein
    the switching includes switching to the first display mode when the driver of the vehicle has their hands on the steering wheel of the vehicle, and switching to the second display mode when the driver of the vehicle does not have their hands on the steering wheel of the vehicle.

12. The vehicle display control method according to claim 9, wherein
    in the first display mode, the second display area that displays the road condition is located within the first display area that displays the map, and
    in the second display mode, the first display area that displays the map is located within the second display area that displays the road condition.

13. The vehicle display control method according to claim 9, wherein
the road condition that is displayed in the second display area includes a lane image, an image portraying the vehicle and an image of a preceding vehicle that is located ahead of the vehicle in a travelling direction of the vehicle and in a same lane as the vehicle.

14. A non-transitory storage medium storing instructions that are executable by one or more processors and that cause the one or more processors to perform functions comprising:
acquiring map information based on a current position of a vehicle;
acquiring peripheral information of the vehicle;
setting, on a display unit in a vehicle cabin of the vehicle and based on the map information and the peripheral information, (i) a first display area that displays a map of an area around the vehicle and (ii) a second display area that displays a road condition around the vehicle; and
switching between (a) a first display mode in which the first display area that displays the map is larger than the second display area that displays the road condition, and (b) a second display mode in which the second display area that displays the road condition is larger than the first display area that displays the map, wherein
the switching between the first display mode and the second display mode is based on a driving state of a driver of the vehicle.

15. The non-transitory storage medium according to claim 14, wherein
the driving state of the driver of the vehicle is whether or not the driver of the vehicle has their hands on a steering wheel of the vehicle, so that the switching between the first display mode and the second display mode is based on whether or not the driver of the vehicle has their hands on the steering wheel of the vehicle or does not have their hands on the steering wheel of the vehicle.

16. The non-transitory storage medium according to claim 15, wherein
the switching includes switching to the first display mode when the driver of the vehicle has their hands on the steering wheel of the vehicle, and switching to the second display mode when the driver of the vehicle does not have their hands on the steering wheel of the vehicle.

17. The non-transitory storage medium according to claim 14, wherein
in the first display mode, the second display area that displays the road condition is located within the first display area that displays the map, and
in the second display mode, the first display area that displays the map is located within the second display area that displays the road condition.

18. The non-transitory storage medium according to claim 14, wherein
the road condition that is displayed in the second display area includes a lane image, an image portraying the vehicle and an image of a preceding vehicle that is located ahead of the vehicle in a travelling direction of the vehicle and in a same lane as the vehicle.

* * * * *